(12) United States Patent
Gong

(10) Patent No.: US 12,461,766 B2
(45) Date of Patent: Nov. 4, 2025

(54) ONLINE MIGRATION METHOD AND SYSTEM FOR BARE METAL SERVER

(71) Applicant: Huawei Cloud Computing Technologies Co., Ltd., Guizhou (CN)

(72) Inventor: Lei Gong, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 438 days.

(21) Appl. No.: 18/175,853

(22) Filed: Feb. 28, 2023

(65) Prior Publication Data

US 2023/0214245 A1 Jul. 6, 2023

Related U.S. Application Data

(63) Continuation of application No. PCT/CN2021/092962, filed on May 11, 2021.

(30) Foreign Application Priority Data

Aug. 29, 2020 (CN) .......................... 202010890874.4
Nov. 25, 2020 (CN) .......................... 202011337002.1

(51) Int. Cl.
G06F 9/455 (2018.01)

(52) U.S. Cl.
CPC ...... G06F 9/45541 (2013.01); G06F 9/45558 (2013.01); *G06F 2009/4557* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 6,122,629 A * | 9/2000 | Walker | .................... | G06F 16/10 |
| | | | | 707/613 |
| 6,643,672 B1 * | 11/2003 | Lebel | .................... | G06F 9/5016 |
| 9,733,980 B1 * | 8/2017 | Khan | .................. | H04L 41/0813 |
| 10,534,629 B1 * | 1/2020 | St. Pierre | .............. | G06F 9/5055 |
| 2002/0166118 A1 * | 11/2002 | Kovan | .................. | G06F 16/958 |
| | | | | 707/E17.116 |

(Continued)

FOREIGN PATENT DOCUMENTS

| | | |
|---|---|---|
| CN | 110879741 A | 3/2020 |
| EP | 2879053 A1 | 6/2015 |

*Primary Examiner* — Adam Lee
(74) *Attorney, Agent, or Firm* — Conley Rose, P.C.

(57) ABSTRACT

An online migration method and system for a bare metal server, where a first hardware card receives a migration command for a first bare metal server, and where the first hardware card is inserted into the first bare metal server. The first hardware card notifies, based on the migration command, the first bare metal server to start a virtual machine manager in the first bare metal server, where the virtual machine manager records first dirty memory page location information that is for memory of the first bare metal server and that is generated by the first bare metal server, and sends the first dirty memory page location information to the first hardware card. The first hardware card online migrates a dirty memory page of the first bare metal server to a second bare metal server based on the first dirty memory page location information.

20 Claims, 11 Drawing Sheets

(56) References Cited

U.S. PATENT DOCUMENTS

| | | | | |
|---|---|---|---|---|
| 2008/0098185 | A1* | 4/2008 | Mohideen | G06F 12/08 |
| | | | | 711/159 |
| 2008/0222633 | A1* | 9/2008 | Kami | G06F 9/4856 |
| | | | | 718/1 |
| 2011/0208908 | A1* | 8/2011 | Chou | G06F 11/203 |
| | | | | 718/1 |
| 2012/0179874 | A1* | 7/2012 | Chang | H04L 67/1097 |
| | | | | 718/1 |
| 2013/0024598 | A1* | 1/2013 | Serebrin | G06F 12/1036 |
| | | | | 711/6 |
| 2013/0254521 | A1* | 9/2013 | Bealkowski | H04L 67/141 |
| | | | | 713/2 |
| 2014/0089447 | A1* | 3/2014 | Uchida | H04L 67/1097 |
| | | | | 709/212 |
| 2018/0373553 | A1* | 12/2018 | Connor | G06F 9/45558 |
| 2019/0361728 | A1* | 11/2019 | Kumar | H04L 67/34 |
| 2020/0257519 | A1* | 8/2020 | Shen | G06F 8/63 |
| 2021/0089347 | A1* | 3/2021 | Gaonkar | G06F 8/656 |
| 2021/0406050 | A1* | 12/2021 | Huang | G06F 9/4856 |

* cited by examiner

ONLINE MIGRATION METHOD AND SYSTEM FOR BARE METAL SERVER

CROSS-REFERENCE TO RELATED APPLICATIONS

This is a continuation of International Patent Application No. PCT/CN2021/092962, filed on May 11, 2021, which claims priority to Chinese Patent Application No. 202010890874.4, filed on Aug. 29, 2020 and Chinese Patent Application No. 202011337002.1, filed on Nov. 25, 2020. All of the aforementioned patent applications are hereby incorporated by reference in their entireties.

TECHNICAL FIELD

This application relates to the server field, and in particular, to an online migration method and system for a bare metal server.

BACKGROUND

A bare metal server (BMS) is an upgraded version of a conventional physical server, and has both outstanding performance of the conventional physical server and a convenient management platform of a cloud host. This provides excellent computing performance for a tenant, and can meet a requirement for high performance and stability in a core application scenario, for example, a high-performance computing load, big data, a distributed database, a predictable performance service scenario that requires consistency.

Currently, the BMS cannot implement online migration. However, to achieve load balance and avoid a hardware fault in advance without service interruption, the BMS needs to use online migration. Therefore, online migration of the BMS is of great significance.

SUMMARY

To resolve the foregoing problem, this application provides an online migration method and system for a bare metal server to implement online hot migration for a BMS.

According to a first aspect, an online migration method for a bare metal server is provided, where the method includes the following.

A first hardware card receives a migration command for a first bare metal server, where the first hardware card is inserted into the first bare metal server. The first hardware card notifies, based on the migration command, the first bare metal server to start a virtual machine manager, where the virtual machine manager records first dirty memory page location information that is for memory of the first bare metal server and that is generated by the first bare metal server, and sends the first dirty memory page location information to the first hardware card. The first hardware card online migrates a dirty memory page of the first bare metal server to a second bare metal server based on the first dirty memory page location information.

In the foregoing solution, after receiving the migration command, the first hardware card notifies the first bare metal server to start the virtual machine manager to record the first dirty memory page location information that is for the memory of the first bare metal server and that is generated by the first bare metal server, to online migrate the dirty memory page of the first bare metal server to the second bare metal server, thereby implementing online migration of a BMS. In addition, the first hardware card undertakes the work of online migrating the dirty memory page of the first bare metal server based on the first dirty memory page location information, such that a burden of the first bare metal server can be effectively reduced.

In some possible designs, after the first hardware card receives the online migration command for the first bare metal server, the method includes: The first hardware card records second dirty memory page location information that is for the memory of the first bare metal server and that is generated by the first hardware card.

In the foregoing solution, the first hardware card may further record the second dirty memory page location information that is for the memory of the first bare metal server and that is generated by the first hardware card, and send a second dirty memory page based on the second dirty memory page location information.

In some scenarios, the first hardware card may write data into the memory of the first bare metal server in a direct memory access (DMA) manner. Modification of memory data of the first bare metal server in this manner cannot be monitored by the virtual machine manager of the first bare metal server. Therefore, the first hardware card needs to record the second dirty memory page location information, such that the first hardware card online migrates memory data modified due to DMA to the second bare metal server that is used as a target end.

In some possible designs, that the first hardware card online migrates the dirty memory page of the first bare metal server to the second bare metal server based on the first dirty memory page location information includes: The first hardware card obtains, from the memory based on the first dirty memory page location information, at least one first memory page that generates a dirty page; obtains, from the memory based on the second dirty memory page location information, at least one second memory page that generates a dirty page; and sends the at least one first memory page and the at least one second memory page to a second hardware card, where the second hardware card is connected to the first hardware card through a network. The second hardware card sets memory of the second bare metal server based on the at least one first memory page and the at least one second memory page, where the second hardware card is inserted into the second bare metal server.

The first hardware card separately obtains corresponding memory pages from the memory of the first bare metal server using the first dirty memory page location information and the second dirty memory page location information. The memory pages are dirty memory pages, that is, memory pages into which data is written or on which data is modified. The first hardware card sends the memory pages to the second hardware card through a network, such that the second hardware card sets the memory of the second bare metal server based on the memory pages. Therefore, a memory change of the first bare metal server can be synchronized to the memory of the second bare metal server in real time, thereby implementing online migration of the bare metal server.

In some possible designs, after the at least one first memory page and the at least one second memory page are sent to the second hardware card, the method includes: The first hardware card obtains a first input/output (I/O) device status of an I/O device of the first bare metal server, obtains a second I/O device status of an I/O device of the first hardware card, and sends the first I/O device status and the second I/O device status to the second hardware card. The second hardware card sets an I/O device of the second hardware card based on the second I/O device status, and sends the first I/O device status to the second bare metal server, such that the second bare metal server sets an I/O device of the second bare metal server based on the first I/O device status.

In the foregoing solution, the first hardware card may send an I/O device status to the second hardware card, to restore the I/O device status on the second hardware card.

In some possible designs, before the virtual machine manager records the first dirty memory page location information that is for the memory of the first bare metal server and that is generated by the first bare metal server, the method further includes: The virtual machine manager sends a full memory page of the first bare metal server to the first hardware card, the first hardware card sends the full memory page to the second hardware card, and the second hardware card initializes the memory of the second bare metal server based on the full memory page.

In some possible designs, the method further includes: The second hardware card receives the migration command. The second hardware card mounts, based on the migration command, a network disk mounted on the first hardware card, and notifies the second bare metal server to start a virtual machine manager in the second bare metal server.

In some possible designs, the method further includes: The first hardware card sends network configuration information of a source BMS to the second hardware card, and the second hardware card performs network configuration based on the network configuration information.

The network configuration information of the source BMS includes network-related information of the source BMS such as an Internet Protocol (IP) address and a bandwidth packet (used to indicate rate limiting configuration for uplink and downlink traffic of the source BMS).

In some possible designs, after the first hardware card sends the network configuration information of the source BMS to the second hardware card, the method further includes: The first hardware card notifies a cloud management platform that migration of the first bare metal server is completed.

In some possible designs, shared memory is set on the first hardware card, and the shared memory can be accessed by the virtual machine manager of the first bare metal server.

In some possible designs, that the first hardware card starts a virtual machine manager based on the migration command includes: The first hardware card generates an interrupt signal based on the migration command. The first bare metal server receives the interrupt signal, and starts the virtual machine manager of the first bare metal server based on the interrupt signal.

In some possible designs, the interrupt signal is a system management interrupt of an x86 processor, or the interrupt signal is a secure monitor call (SMC) or a secure interrupt of an ARM processor.

According to a second aspect, an online migration system for a bare metal server is provided, where the online migration system for a bare metal server includes a first bare metal server, a first hardware card, a second bare metal server, and a second hardware card. The first hardware card is configured to receive a migration command for the first bare metal server, where the first hardware card is inserted into the first bare metal server. The first hardware card is configured to notify, based on the migration command, the first bare metal server to start a virtual machine manager, where the virtual machine manager records first dirty memory page location information that is for memory of the first bare metal server and that is generated by the first bare metal server, and sends the first dirty memory page location information to the first hardware card. The first hardware card is configured to online migrate a dirty memory page of the first bare metal server to the second bare metal server based on the first dirty memory page location information.

In some possible designs, the first hardware card is configured to record second dirty memory page location information that is for the memory of the first bare metal server and that is generated by the first hardware card.

In some possible designs, the first hardware card is configured to: obtain, from the memory based on the first dirty memory page location information, at least one first memory page that generates a dirty page; obtain, from the memory based on the second dirty memory page location information, at least one second memory page that generates a dirty page; and send the at least one first memory page and the at least one second memory page to the second hardware card, where the second hardware card is connected to the first hardware card through a network. The second hardware card is configured to: set memory of the second bare metal server based on the at least one first memory page and the at least one second memory page, where the second hardware card is inserted into the second bare metal server.

In some possible designs, the first hardware card is configured to: obtain a first I/O device status of an I/O device of the first bare metal server, obtain a second I/O device status of an I/O device of the first hardware card, and send the first I/O device status and the second I/O device status to the second hardware card. The second hardware card is configured to: set an I/O device of the second hardware card based on the second I/O device status, and send the first I/O device status to the second bare metal server, such that the second bare metal server sets an I/O device of the second bare metal server based on the first I/O device status.

In some possible designs, the first bare metal server is configured to send a full memory page of the first bare metal server to the first hardware card, the first hardware card is configured to send the full memory page to the second hardware card, and the second hardware card is configured to initialize the memory of the second bare metal server based on the full memory page.

In some possible designs, the second hardware card receives the migration command. The second hardware card mounts, based on the migration command, a network disk mounted on the first hardware card; and notifies the second bare metal server to start a virtual machine manager in the second bare metal server.

In some possible designs, the first hardware card is configured to send network configuration information of the source BMS to the second hardware card; and the second hardware card is configured to perform network configuration based on the network configuration information.

In some possible designs, the first hardware card is configured to notify a cloud management platform that migration of the first bare metal server is completed.

In some possible designs, shared memory is set on the first hardware card, and the shared memory is accessed by the virtual machine manager of the first bare metal server.

In some possible designs, the first hardware card is configured to generate an interrupt signal based on the migration command, and the first bare metal server is configured to receive the interrupt signal and start the virtual machine manager of the first bare metal server based on the interrupt signal.

In some possible designs, the interrupt signal is a system management interrupt of an x86 processor, or the interrupt signal is an SMC or a secure interrupt of an ARM processor.

According to a third aspect, a bare metal server system is provided, where the bare metal server system includes a first bare metal server and a first hardware card. The first hardware card is configured to receive a migration command for the first bare metal server, where the first hardware card is inserted into the first bare metal server. The first hardware card is configured to notify, based on the migration command, the first bare metal server to start a virtual machine manager, where the virtual machine manager records first dirty memory page location information that is for memory of the first bare metal server and that is generated by the first bare metal server, and sends the first dirty memory page location information to the first hardware card. The first hardware card is configured to online migrate a dirty memory page of the first bare metal server to a second bare metal server based on the first dirty memory page location information.

In some possible designs, the first hardware card is configured to record second dirty memory page location information that is for the memory of the first bare metal server and that is generated by the first hardware card.

In some possible designs, the first hardware card is configured to notify a cloud management platform that migration of the first bare metal server is completed.

In some possible designs, shared memory is set on the first hardware card, and the shared memory is accessed by the virtual machine manager of the first bare metal server.

According to a fourth aspect, a hardware card is provided, including a dynamic configuration module and an intelligent transfer module.

The dynamic configuration module is configured to receive a migration command for a first bare metal server, where a first hardware card is inserted into the first bare metal server. The intelligent transfer module is configured to notify, based on the migration command, the first bare metal server to start a virtual machine manager, where the virtual machine manager records first dirty memory page location information that is for memory of the first bare metal server and that is generated by the first bare metal server, and sends the first dirty memory page location information to the first hardware card. The intelligent transfer module is configured to online migrate a dirty memory page of the first bare metal server to a second bare metal server based on the first dirty memory page location information.

According to a fifth aspect, a hardware card is provided, including a processor and a memory. The processor executes a program in the memory, to perform the method according to the first item or the second item of the first aspect.

According to a sixth aspect, a computer-readable storage medium is provided, including instructions. When the instructions are run on a first hardware card, the first hardware card is enabled to perform the method according to the first item or the second item of the first aspect.

According to a seventh aspect, a computer-readable storage medium is provided, including instructions. When the instructions are run on a first hardware card, the first hardware card is enabled to perform the method according to the first item or the second item of the first aspect.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

Figure 1:
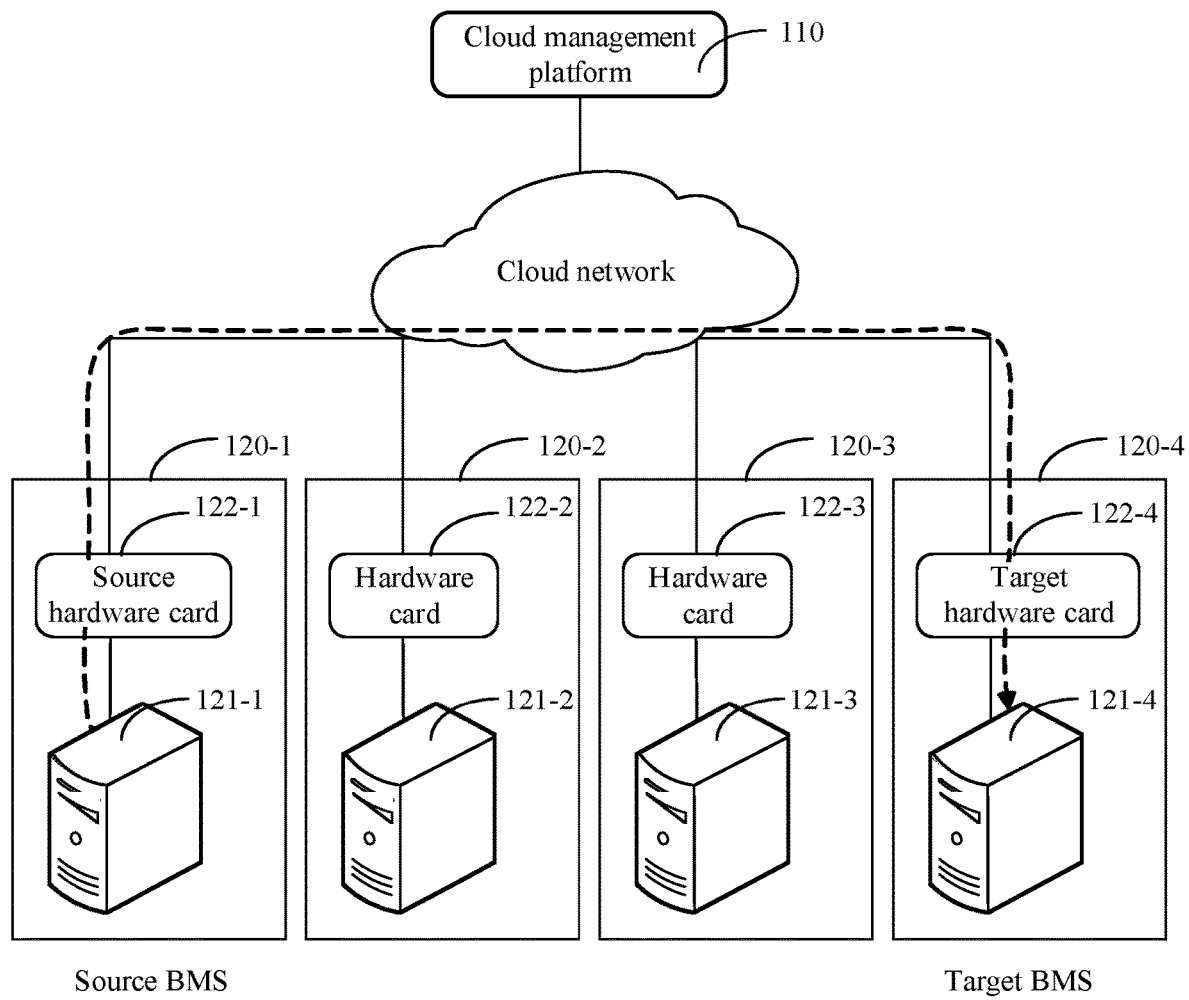
FIG. 1 is a schematic diagram of a structure of an online migration system for a BMS according to this application.

Term explanations are provided below.

Cloud management platform: A cloud management platform provides an access interface, and the access interface lists cloud services provided by a public cloud. A tenant can access the cloud management platform using a browser or another client, and purchase a corresponding cloud service on the cloud management platform. After the cloud service is purchased, the cloud management platform provides the tenant with permission to access the cloud service, such that the tenant can remotely access the cloud service and perform corresponding configuration.

Public cloud: A public cloud usually refers to a cloud service provided by a cloud provider for a tenant (for example, a tenant). The tenant may access a cloud management platform through the Internet, and purchase and use, on the cloud management platform, a cloud service provided by the public cloud. A core attribute of the public cloud is a resource sharing service. The public cloud may be implemented using a data center of a public cloud service provider. A plurality of physical servers are disposed in the data center, and the plurality of physical servers provide a computing resource, a network resource, and a storage resource required by the cloud service.

Bare metal server (BMS): A bare metal server is a computing service that combines elasticity of a virtual machine and performance of a physical machine, provides a dedicated cloud physical server, and provides excellent computing performance and data security for services such as a core database, a key application system, high-performance computing, and big data. A tenant purchases a right of use for the BMS on a cloud management platform. The cloud management platform provides remote login to the BMS, installs a required operating system in the BMS, sets an application in the operating system, and provides a tenant-specific service by running the application. The service is implemented based on a computing resource, a network resource, and a storage resource provided by the BMS.

The BMS is a physical server in a data center of a public cloud service provider. A hardware card is inserted into the physical server. The hardware card may perform data communication with the cloud management platform on a control plane, and communicate with the physical server, such that the cloud management platform can manage the physical server using the hardware card, for example, installing an operating system for the physical server, or enabling a remote login service of the physical server to enable the tenant to remotely log in to the physical server.

The control plane is implemented on the hardware card, such that the BMS does not need to process control-plane work that is unrelated to a service of the tenant, such that the tenant can completely use the BMS to run an application of the tenant. Therefore, consumer rights and interests of the tenant can be further ensured.

For example, the application may be web page service software. After the web page service software is installed on the BMS, the tenant uploads, to the BMS, a web page that needs to be published on an external network. The BMS runs the web page service software. The web page service software shares the web page of the tenant with the external network by opening a port 80 or a port 8080. A tenant of the external network may access, using a browser, a domain name bound to the web page service software, to access the web page on the BMS. Storage space of the web page in the BMS, uplink and downlink network traffic related to interaction with the browser or another device that accesses the BMS, and a central processing unit (CPU) and memory that are required to run the web page service software are all provided by the BMS. The tenant may obtain different computing resources, network resources, and storage resources by purchasing BMSs of different specifications on the cloud management platform. The application installed on the BMS may alternatively be database software or another application that the tenant wants to configure. This is not limited in the embodiments of the present disclosure.

Dirty memory page: A dirty memory page is a memory page that is in a source BMS and that needs to be synchronized to a target BMS to ensure memory consistency between the source BMS and the target BMS.

Online migration: Online migration is also referred to as live migration or hot migration. In the embodiments of the present disclosure, online migration means the following: When a physical server that is in a data center of a public cloud service provider and that is used as a source BMS requires firmware upgrade, needs to be restarted, or requires power-off maintenance, or another case that affects running of an application occurs, a cloud management platform needs to select, from the data center, another physical server to be used as a target BMS. A specification of the physical server is the same as a specification of the physical server that is used as the source BMS. In addition, a memory page of the source BMS is copied to the target BMS, and a network disk of the source BMS is mounted to the target BMS, such that the target BMS can run an application of the source BMS.

In an online migration process of the memory page, the memory page of the source BMS is migrated to the target BMS in real time while normal running of the application of the source BMS is ensured. To ensure availability of a BMS application in a migration process, there is only extremely short downtime during the migration process. In a previous phase of migration, the application is run on the source BMS. When memory page migration reaches a specific phase, a memory page of the target BMS is completely the same as the memory page of the source BMS (or the memory page of the target BMS is approximately completely the same as the memory page of the source BMS, for example, more than 99% of the memory pages are the same). After extremely short time of switching (for example, within seconds), the cloud management platform transfers a tenant's control over the source BMS to the target BMS, and a BMS service continues to run on the target BMS. For a BMS service, because the switching time is extremely short, the tenant cannot feel that the BMS has been replaced. Therefore, the migration process is transparent to the tenant. Therefore, online migration is applicable to a scenario in which a high requirement is posed on service coherence.

Virtual machine manager (VMM): A virtual machine manager is implemented using a kernel of an operating system, and the virtual machine manager may manage and maintain a virtual machine created by the operating system.

The following describes in detail definitions of a system management mode (SMM) and a trust zone in this application.

The SMM is an execution mode of an x86 processor and has a highest privilege level. Therefore, various privileged instructions and input/output (I/O) operations can be executed in the SMM. When an SMM interrupt pin of the processor is activated or a system management interrupt (SMI) is received from an advanced programmable interrupt controller (APIC), the processor enters the SMM. After entering the SMM, the processor stops running of a current operating system, stores a CPU register status of the current operating system into secure system management memory (e.g., system management (SM)-random-access memory (RAM)), disables another interrupt and exception, and executes, in the SMRAM, code specified by an SMI interrupt processing program. The SMM is transparent to the operating system, the operating system does not know specific time at which the processor enters the SMM, a specific operation performed in the SMM mode, and specific time at which the processor exits from the SMM. The SMI is an interrupt with a relatively high priority level, for example, the priority level of the SMI is 3. Therefore, most interrupts may be shielded. After receiving an instruction (e.g., resume from system management (SM) Mode (RSM) instruction, the processor exits from the SMM. After exiting from the SMM, the processor stops executing, in the SMRAM, the code specified by the SMI interrupt processing program, reads the CPU register status of the current operating system from the SMRAM and restores the CPU register status, and starts another interrupt and exception.

An EL3 mode is an execution mode of an ARM processor, and has a highest privilege level. Therefore, various privileged instructions and I/O operations may be executed in the EL3 mode. When the processor receives a secure monitor call (SMC) or a secure interrupt, the processor enters the EL3 mode. After entering the EL3 mode, the processor stops running of a current operating system, stores a CPU register status of the current operating system into a secure memory region (SMR), disables another interrupt and exception, and executes, in the SMR, code specified by SMC exception processing program. After receiving an exception return (ERET) instruction, the processor exits from the EL3 mode. After exiting from the EL3 mode, the processor stops executing, in the SMR, the code specified by the SMC exception processing program, reads the CPU register status of the current operating system from the SMR and restores the CPU register status, and starts another interrupt and exception. The EL3 mode is transparent to the operating system, the operating system does not know specific time at which the processor enters the EL3 mode, a specific operation performed in the EL3 mode, and specific time at which the processor exits from the EL3 mode.

FIG. 1 is a schematic diagram of a structure of an online migration system for a BMS according to this application. As shown in FIG. 1, the online migration system in this application includes a cloud management platform 110 and a plurality of BMS systems. The BMS system may include a BMS system 120-1, a BMS system 120-2, a BMS system 120-3, and a BMS system 120-4. The BMS system 120-1 may include a BMS 121-1 and a hardware card 122-1. The BMS system 120-2 may include a BMS 121-2 and a hardware card 122-2. The BMS system 120-3 may include a BMS 121-3 and a hardware card 122-3. The BMS system 120-4 may include a BMS 121-4 and a hardware card 122-4. The cloud management platform 110 may be connected to each hardware card through a network, and the hardware card may be connected to the BMS through a preset interface, for example, a Peripheral Component Interconnect (PCI) Express (PCIe or PCI-E) interface. Different hardware cards may communicate with each other through a network. The online migration system may be disposed in a data center of a public cloud service provider.

The cloud management platform 110 is configured to manage the plurality of BMSs.

The BMS is an independent physical server. A tenant purchases the BMS on the cloud management platform 110. The cloud management platform 110 sends, based on purchase information, management information to a hardware card inserted into the purchased BMS. The hardware card sets the BMS based on the management information, for example, installs a corresponding operating system based on a tenant requirement, and opens a remote login server, such that the tenant can remotely log in to the BMS, and completely exclusively occupies physical resources (including a computing resource, a network resource, and a storage resource) of the BMS.

In this embodiment of the present disclosure, before and after online migration is performed, an operating system in the BMS may be switched between a bare-metal state and a virtualized state through control of the hardware card.

Figure 2:
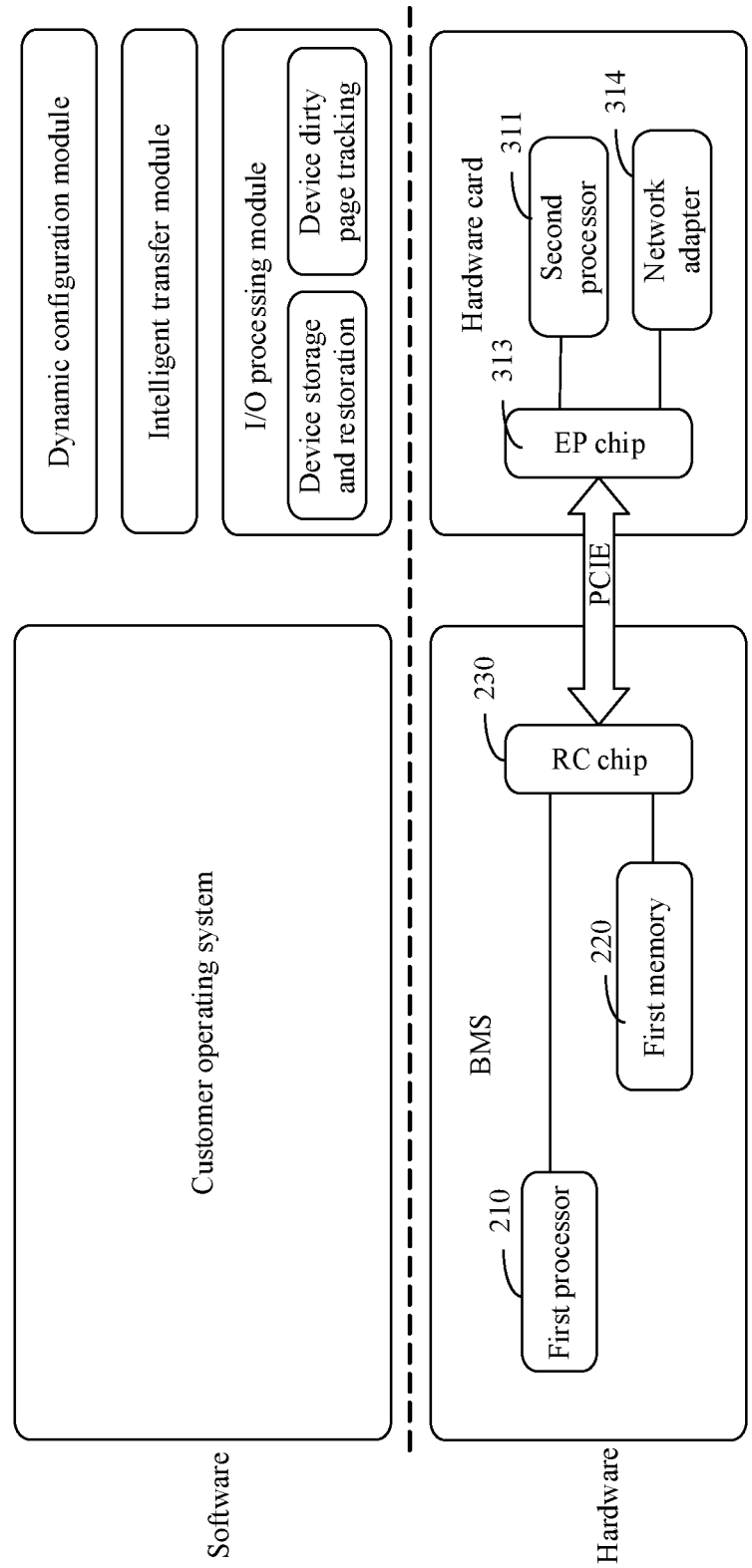
FIG. 2 is a schematic diagram of a structure of a BMS in a bare-metal state according to an embodiment of this application.

A left part of FIG. 2 is a schematic diagram of a structure of a BMS in a bare-metal state. The BMS in the bare-metal state may include a hardware layer and a software layer. The software layer includes a customer operating system, and the hardware layer includes hardware such as a first processor 210, first memory 220, and a root complex (RC) chip 230. In another embodiment, there may be more or less processors 210 and virtual machines.

The hardware layer may include one or more first processors 210, first memory 220, and an RC chip 230. The first processor 210 may be a central processing unit (CPU). The CPU may use a complex instruction set computer (CISC) architecture (for example, an x86 architecture), a reduced instruction set computing (RISC) architecture (for example, a microprocessor without interlocked pipeline stages (MIPS) architecture), or the like.

The first memory 220 may store code of an operating system, a virtual machine monitor (VMM), and the like. The customer operating system may be a system installed by a tenant. The VMM is optional, the VMM does not work when online migration is not performed, and works only when online migration is performed. The RC chip 230 includes one or more PCIe interfaces, and is configured to connect a subsystem including the first processor 210 and the first memory 220 to a hardware card. The RC chip may be implemented in a discrete device, or may be integrated in the first processor 210. The first processor 210 further includes a digital signal processor (DSP), a graphics processing unit (GPU), a neural-network processing unit (NPU), and the like. When there are a plurality of first processors 210, the first processors 210 may use a homogeneous structure, or may use a heterogeneous structure. A common heterogeneous structure may be CPU+DSP, CPU+NPU, CPU+GPU, CPU+DSP+GPU, or the like.

The software layer includes the customer operating system. It may be understood that before hot migration is performed or after hot migration is performed, the VMM does not need to be run, thereby effectively reducing resource consumption of the BMS.

The hardware card may be an application specific integrated circuit (ASIC) card, a field programmable gate array (FPGA) card, or the like. As shown in FIG. 2 and a right side of FIG. 3, the hardware card may include one or more second processors 311, an end point (EP) chip 313, and a network adapter 314.

There are one or more second processors 311. For example, the second processor 311 may be a digital signal processor (DSP), a central processing unit (CPU), and/or a neural-network processing unit (NPU). A processing capability of the second processor 311 may be weaker than a processing capability of the first processor 210.

The EP chip is a hardware interface defined in the PCIe specification. As a peripheral interface of the hardware card, the EP chip is responsible for sending a PCIe message to the BMS, or may receive a PCIe message sent by the BMS.

Implementation of the RC chip and the EP chip is not limited in this embodiment of this application, and any RC chip and EP chip that are implemented in compliance with the PCIe specification can be used.

It should be noted that the hardware card may further be connected to a network disk using a network adapter, such that the hardware card forwards, to the network disk for processing, an I/O request delivered in the BMS to the network disk for processing.

The software layer of the hardware card includes an I/O processing module, an intelligent transfer module, and a dynamic configuration module. Herein, the I/O processing module may implement device status storage and restoration and perform dirty memory page tracking on data written into the first memory 220 by the hardware card. The RC chip of the BMS and the EP chip of the hardware card can be connected through a PCIE interface. Functions of the I/O processing module, the intelligent transfer module, and the dynamic configuration module are introduced in detail later, and descriptions are not provided herein.

In the bare-metal state, the customer operating system in the BMS directly is run on the hardware.

The first processor 210 may include one or more physical cores (the physical core is sometimes referred to as a core for short in this application). The "physical core" represents a minimum processing unit in this application. In this embodiment, each first processor 210 has two physical cores: a core 0, a core 1, and a plurality of registers. The registers may be high-speed storage components with a limited storage capacity, and may be configured to temporarily store data in an OS state, such as an instruction, data, and an address. For example, the register may be an instruction register (IR), a program counter (PC), and an accumulator (ACC). In some other embodiments, the first processor 210 may include more or less cores, and quantities of cores included in the first processors 210 may also be different. The first memory 220, such as a cache, is configured to store an instruction or data that has just been used or is cyclically used by the first processor 210. If the first processor 210 needs to use the instruction or data again, the first processor 210 may directly invoke the instruction or data from the first memory 220, thereby reducing waiting time of the first processor 210, and improving system efficiency. The first memory 220 may store code of an operating system, a virtual machine monitor (VMM), and the like. The customer operating system may be a system installed by a tenant. The VMM is optional, the VMM does not work when online migration is not performed, and works only when online migration is performed. The RC chip 230 includes one or more PCIe interfaces, and is configured to connect the subsystem including the first processor 210 and the first memory 220 to the hardware card. The RC chip may be implemented in a discrete device, or may be integrated in the first processor 210. The first processing unit further includes a digital signal processor (DSP), a graphics processing unit (GPU), a neural-network processing unit (NPU), and the like.

Figure 3:
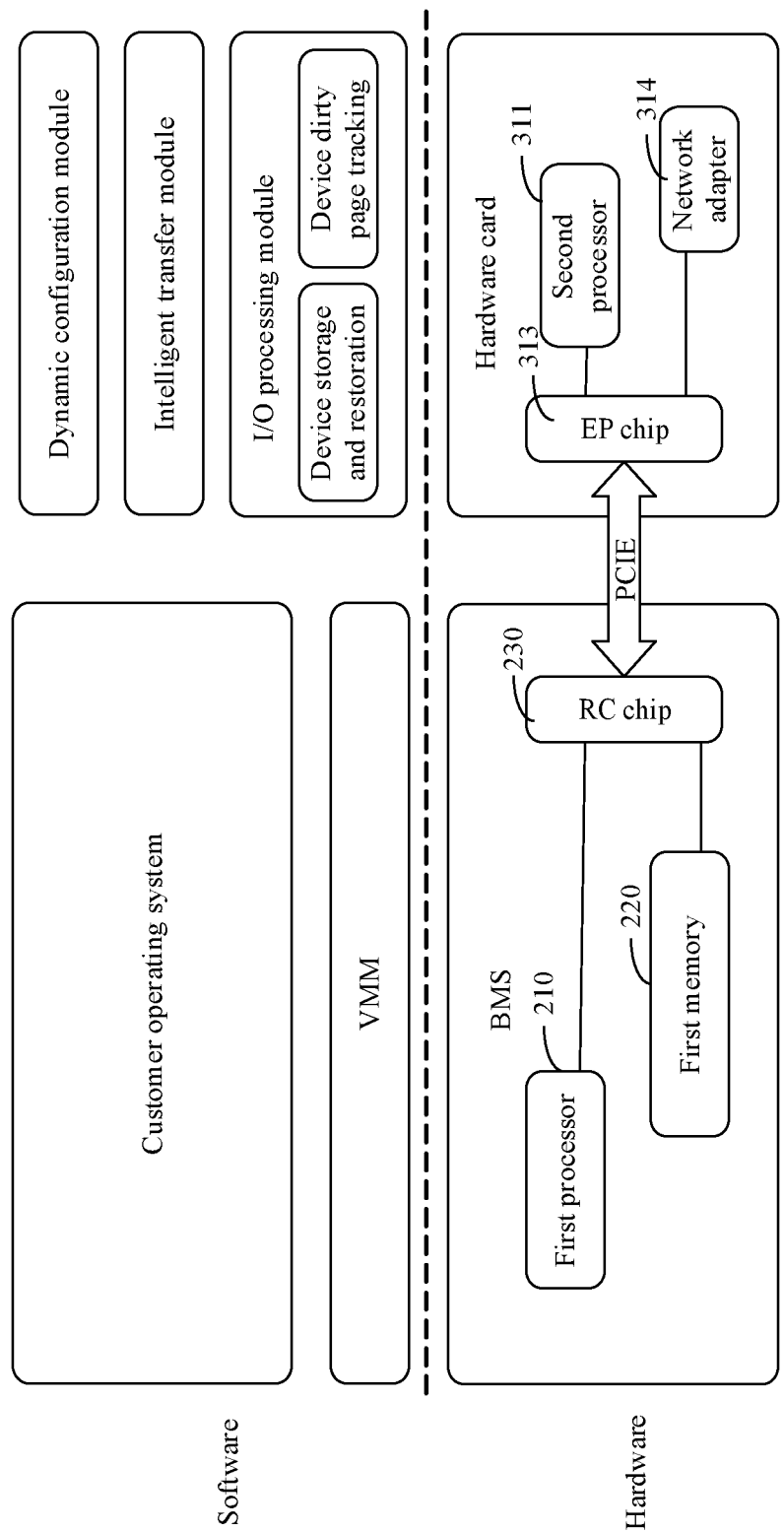
FIG. 3 is a schematic diagram of a structure of a BMS in a virtualized state according to an embodiment of this application.

Referring to FIG. 3, a left part of FIG. 3 is a schematic diagram of a structure of a BMS in a virtualized state. Compared with FIG. 2, a VMM is added to a software part of the BMS in FIG. 3, and the VMM is equivalent to a hypervisor or another type of virtual monitoring apparatus in another virtualized architecture. The VMM can be deployed inside the customer operating system or deployed separate from the customer operating system. The VMM is responsible for managing a virtual machine (a quantity of virtual machines is not limited) running on the VMM. As a virtual monitoring apparatus, the VMM is responsible for scheduling a virtual processor of each virtual machine. For example, a kernel-based virtual machine (KVM) is a typical VMM. Scheduling the virtual processor by the VMM includes swapping in the virtual processor and swapping out the virtual processor. First, the VMM creates and initializes an object of a virtual machine, and then creates three virtual processors for the virtual machine. When a virtual machine includes a plurality of virtual processors, there is usually one main virtual processor, and another virtual processor is a slave virtual processor. The virtual processor is not associated with a physical core at the beginning of being created. The VMM schedules a virtual processor to a physical core based on a policy, which is referred to as that the virtual processor is swapped in. The VMM suspends the virtual processor or migrates the virtual processor out of the physical core, which is referred to as that the virtual processor is swapped out. In a core binding scenario, a virtual processor is scheduled to a same core each time the virtual processor is swapped in. In a non-core binding scenario, before performing scheduling, the VMM may determine, based on a current running status of a system and/or a scheduling algorithm, a specific core to which the virtual processor is to be scheduled.

It should be noted that a virtual processor may not immediately fall into operation after being swapped in. After the virtual processor is swapped in and before the virtual processor falls into operation, a host machine (which is the VMM) may further implement some configuration on the virtual processor, and then the virtual processor falls into a customer mode.

Further, the VMM has a dirty page tracking function. After the VMM is started, the customer operating system at the software layer needs to access hardware through the VMM, which is equivalent to that the customer operating system is managed by the VMM as an operating system of a virtual machine. When an application in the customer operating system runs, the first processor 210 is enabled to write data into the first memory 220, and the VMM may monitor the writing action, and record an address of a memory page that is in the first memory 220 and into which the data is written, thereby implementing the dirty page tracking function.

Figure 4:
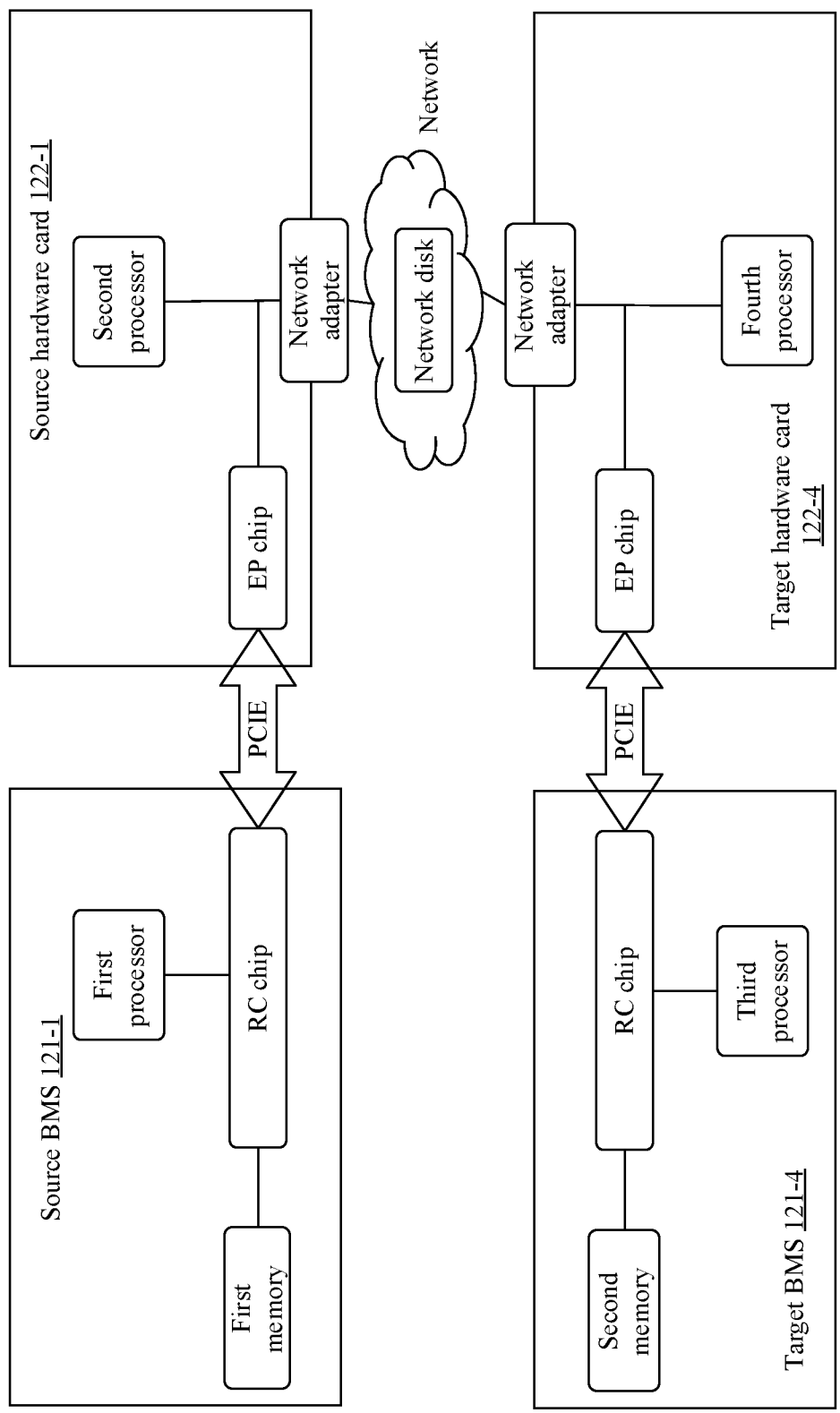
FIG. 4 is a schematic diagram of a structure of an online migration system for a BMS according to an embodiment of this application.

To see a connection relationship between the source BMS 121-1, the source hardware card 122-1, the target hardware card 122-4, and the target BMS 121-4, refer to FIG. 4. FIG. 4 shows the following: An RC chip of the source BMS 121-1 may be connected to an EP chip of the source hardware card 122-1 through a PCIE interface, and a network adapter of the source hardware card 122-1 may be connected to a network adapter of the target hardware card 122-4 through a network. An EP chip of the target hardware card 122-4 is connected to an RC chip of the target BMS 121-4 through a PCIE interface. The network adapter of the source hardware card 122-1 may further be connected to a memory, and the memory may further be connected to the network adapter of the target hardware card 122-4. The foregoing online migration system for a BMS may implement online migration from the source BMS 121-1 to the target BMS 121-4 with assistance of the source hardware card 122-1 and the target hardware card 122-4. Herein, online migration includes online migration of a BMS, online migration of a storage resource, and online migration of a network environment.

Online migration between a source BMS and a target BMS requires assistance of a first VMM of the source BMS and a second VMM of the target BMS. However, the first VMM and the second VMM need to be in a non-working state normally, and the first VMM and the second VMM are activated to enter a working state only when online migration is performed, to reduce resource consumption of the source BMS and the target BMS. After the source BMS is started, the first VMM needs to be started for initialization. However, the first VMM cannot be always in the working state, such that the first VMM needs to be disabled. When online migration needs to be performed, the first VMM is activated to enter the working state. The following method shown in FIG. 5 is a method for disabling the first VMM by the source BMS.

Figure 5:
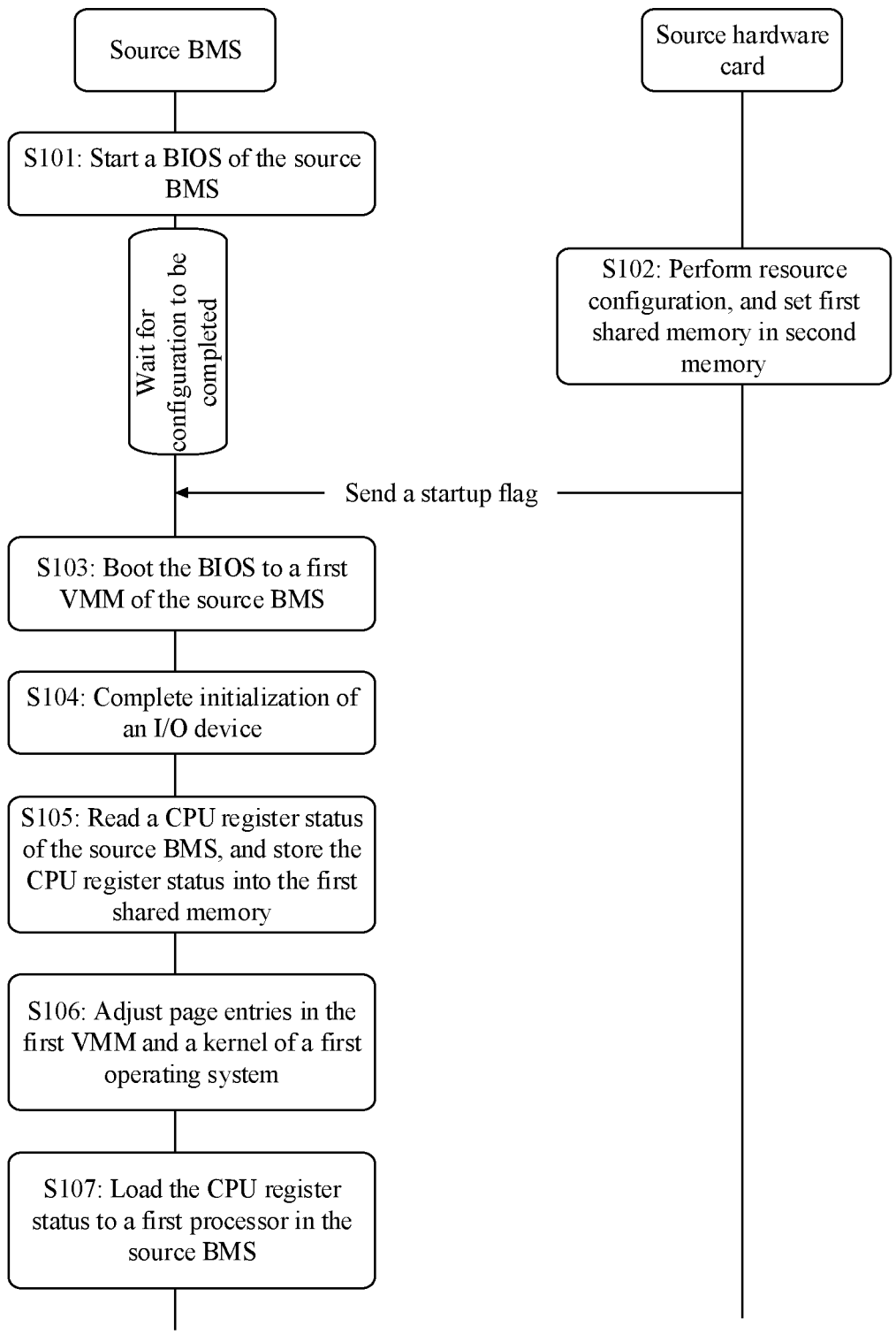
FIG. 5 is an interaction flowchart of a method for disabling a first virtual machine manager (VMM) by a source BMS according to this application.

FIG. 5 is an interaction flowchart of a method for disabling a first VMM by a source BMS according to this application. As shown in FIG. 5, the method for disabling a first VMM by a source BMS includes the following steps.

S101: After being powered on, a source BMS supplies power to a source hardware card, and starts a basic I/O system (BIOS) of the source BMS.

It is pre-set in the BIOS that the source hardware card needs to be booted. After the BIOS of the source BMS is started, the BIOS boots, in a preset order, programs to enter a working state. During the booting process, if the BIOS successfully boots the first program to enter the working state, the BIOS continues to boot a next program to enter the working state, and so on, until the last program is booted to enter the working state. If a program does not successfully enter the working state when the BIOS boots the program, the BIOS continues to wait until the program enters the working state or an error is reported. Therefore, when the BIOS of the source BMS is booted to the source hardware card, the BIOS of the source BMS enters a waiting process to wait for completion of configuration of the source hardware card, and sends a startup flag to the source BMS.

S102: In the waiting process of the BIOS of the source BMS, the source hardware card performs resource configuration, and sets first shared memory in a second internal memory of the source hardware card.

The first shared memory may be set in first memory of the source BMS, and the first shared memory may be accessed by a first operating system in the source BMS and a first VMM in the source BMS. The first shared memory may be configured to store the first VMM of the source BMS.

That the source hardware card performs resource configuration may include: initializing hardware (shielding all interrupts, disabling an internal instruction in a processor/data Cache, and the like), preparing RAM space (for example, reading program code into a RAM and setting the first shared memory), setting a stack, initializing a hardware device that needs to be used in a current phase, detecting memory mapping of the first operating system, reading a kernel image and a root file system image of the first operating system from a Flash to a RAM, setting a startup parameter for a kernel of the first operating system, invoking the kernel of the first operating system, and so on.

After the resource configuration is completed, a dynamic configuration module in the source hardware card generates a startup flag, and sends the startup flag to the BIOS of the source BMS using the first shared memory or a hardware register, to notify the BIOS that the source hardware card is started and that the BIOS can be restarted.

It should be understood that, the foregoing example is described using an example in which the first shared memory is set in the second internal memory of the source hardware card. In another embodiment, second shared memory may be set in a network disk, where the second shared memory may be accessed by the first operating system in the source BMS and the first VMM in the source BMS. In addition, for online migration of a bare metal server, only the first shared memory may be set, only the second shared memory may be set, or both the first shared memory and the second shared memory may be set.

S103: After receiving the startup flag, the source BMS determines that the source hardware card is started normally, and boots the BIOS to the first VMM of the source BMS.

It is also pre-set in the BIOS that the first VMM needs to be booted. The first VMM may be stored in the first memory of the source BMS.

S104: The first VMM of the source BMS completes initialization of an I/O device, and stores a status of the I/O device into the first shared memory.

The status of the I/O device may be stored into a register of the I/O device. After the first VMM completes initialization of the I/O device, the status of the I/O device may be taken out of the register and stored into the first shared memory of the source hardware card, such that when the first VMM is re-enabled, the status of the I/O device in the first shared memory may be taken out of the first shared memory and restored, thereby restoring a working state of the first VMM. It may be understood that the status of the I/O device is stored in the first shared memory of the source hardware card, and does not occupy a storage resource of the source BMS, thereby reducing resource consumption of the source BMS.

Because the status of the I/O device is stored in the first shared memory, the status of the I/O device may be accessed by both the first operating system and the first VMM.

S105: The source BMS reads a CPU register status of the source BMS from a hardware-assisted virtualization module, and stores the CPU register status into the first shared memory.

S106. The source BMS adjusts a page entry in the first VMM and a page entry in a kernel of the first operating system using a switching program.

The switching program is responsible for switching between the first VMM and the first operating system. When switching from the first VMM to the first operating system needs to be performed, the first VMM invokes the switching program to perform switching. When switching from the first operating system to the first VMM needs to be performed, the first operating system may invoke the switching program to perform switching. The switching program may be a program pre-stored in the first shared memory, thereby reducing resource consumption of the source BMS. Herein, the source BMS adjusts the page entry in the first VMM and the page entry in the kernel of the first operating system using the switching program, to avoid illegal memory access occurred after switching.

S107: The source BMS loads the CPU register status to a first processor in the source BMS using the switching program, to disable the first VMM.

After the source BMS loads the CPU register status to the first processor in the source BMS, the first VMM stops working, and the first operating system enters a bare-metal working state.

It should be noted that the foregoing method is also applicable to another BMS (including a target BMS) in a data center. Details are not described in this embodiment of the present disclosure.

Figure 6A:
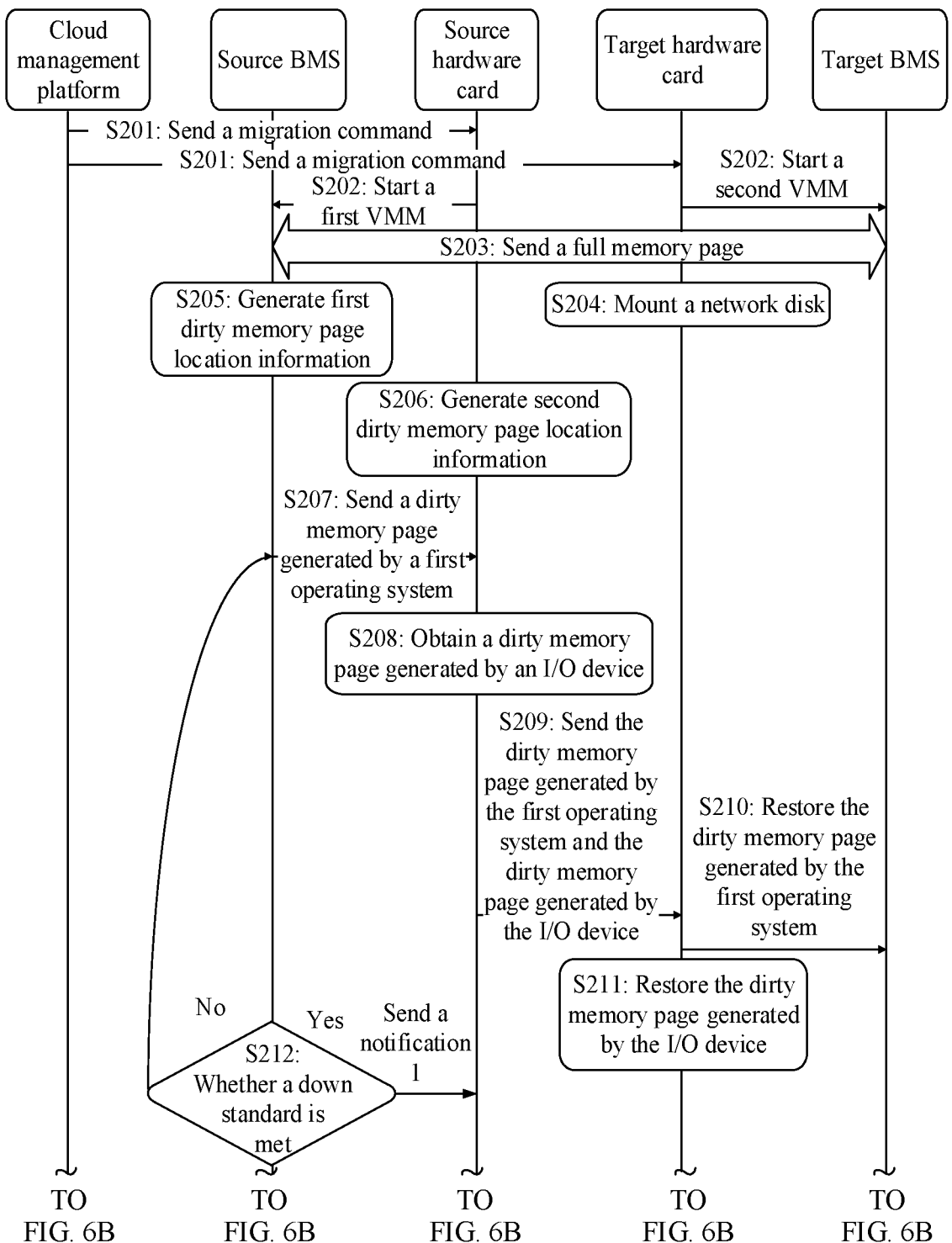
FIG. 6A and FIG. 6B are a schematic diagram of transmitting an online migrated dirty memory page between a source hardware card and a target hardware card according to this application.
Figure 6B:
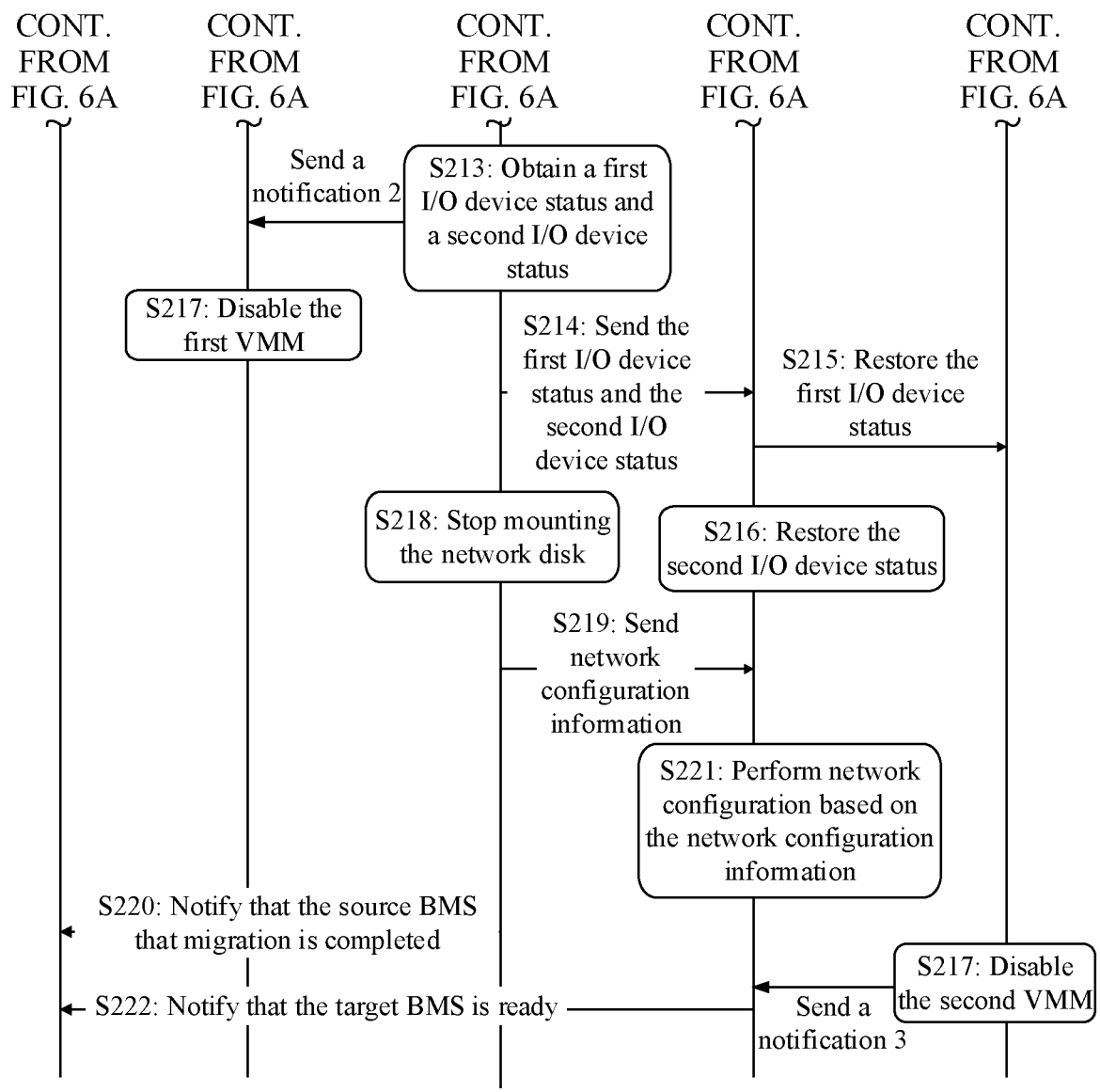

FIG. 6A and FIG. 6B are a schematic diagram of transmitting an online migrated dirty memory page between a source hardware card and a target hardware card according to this application. In an initial state, the source hardware card is mounted with a network disk (as shown in FIG. 4), and the network disk is provided to the source BMS for use. A tenant may store data of the tenant in the network disk after remotely logging in to the source BMS. It should be noted that the network disk may alternatively be a cloud service, and the tenant may purchase the network disk on a cloud management platform and mount the network disk to the source BMS.

A migration method in this embodiment of the present disclosure includes the following steps.

S201: A cloud management platform separately sends a migration command to a source hardware card and a target hardware card. Correspondingly, the source hardware card and the target hardware card separately receive the migration command sent by the cloud management platform.

The migration command is used to instruct a source BMS to online migrate a dirty memory page to a target BMS. The migration command may include an IP address of the source BMS, a media access control (MAC) address of the source BMS, an IP address of the target BMS, a MAC address of the target BMS, other address information that can identify the source BMS and the target BMS, and the like.

The migration command is sent when a migration condition is met.

For example, the migration condition is that the source BMS requires firmware upgrade, needs to be restarted, or requires power-off maintenance, or the migration condition is another case that affects normal working of the source BMS. The cloud management platform may obtain the foregoing case in advance, and send the migration command to the source hardware card and the target hardware card after selecting, from a data center based on the foregoing case, a target BMS that is suitable to serve as a migration target.

S202: The source hardware card notifies the source BMS to enable a first VMM. In addition, the target hardware card notifies the target BMS to enable a second VMM.

After the source hardware card notifies the source BMS to enable the first VMM, the source BMS activates the first VMM. In a process in which the first VMM is activated, the source BMS stores a first I/O device status into first shared memory. For details, refer to the following process of activating the first VMM by the source BMS shown in FIG. 7 and FIG. 8.

S203: The source BMS sends a full memory page to the target BMS using the source hardware card and the target hardware card.

The first VMM of the source BMS first sends the full memory page to the source hardware card. Correspondingly, the source hardware card receives the full memory page sent by the source BMS. The source hardware card sends the full memory page to the target hardware card. Correspondingly, the target hardware card receives the full memory page sent by the source hardware card. The target hardware card sends the full memory page to the second VMM of the target BMS. Correspondingly, the second VMM of the target BMS receives the full memory page sent by the target hardware card.

The second VMM of the target BMS sets memory of the target BMS based on the full memory page, such that the memory of the target BMS is consistent with memory of the source BMS.

Generally, after the target BMS sets full memory, a purpose of memory page migration is implemented. However, in this embodiment of the present disclosure, it is required to ensure that a network resource and a storage resource of the target BMS are the same as those of the source BMS. Therefore, after full memory of the source BMS is set in the target BMS and before the network resource and the storage resource are migrated from the source BMS to the target BMS, the tenant may further access the source BMS, and an operating system in the source BMS continues to perform a writing operation on first memory, to generate a dirty memory page. In addition, the source hardware card may also perform a direct memory access writing operation on the first memory, to generate a dirty memory page.

A purpose of the following steps is to enable the source hardware card to obtain the dirty memory pages generated in the foregoing two cases, and send the dirty memory pages to the target hardware card. The dirty memory pages are sent to the second VMM of the target BMS using the target hardware card. The second VMM updates the full memory based on the dirty memory pages, to ensure that the dirty memory pages generated by the source BMS before migration of the network resource and the storage resource is completed can be synchronized on the target BMS.

S204: The target hardware card mounts a network disk that is being used by the source hardware card.

After the target BMS mounts the network disk that is being used by the source hardware card, the target hardware card and the source hardware card share the network disk. In this case, the target BMS may access the network disk, and the target hardware card provides the network disk to the target BMS for use. Because the target BMS can directly access the network disk, data modification made for the network disk by the source BMS does not need to be synchronized on the target BMS.

Through this step, migration of the storage resource can be completed.

It should be noted that, in a subsequent step, after network resource migration is completed, the source hardware card may stop mounting the network disk, such that the target hardware card may use the network disk alone after the migration is completed, thereby ensuring data security of the tenant.

S205: The first VMM of the source BMS enables a dirty page tracking function, to track a dirty page generated by a first operating system in the first memory of the source BMS, to generate first dirty memory page location information in the first memory of the source BMS.

That the first operating system generates a dirty page in the first memory of the source BMS means the following: When a first processor of the source BMS runs the first operating system, a data writing operation is performed on the first memory, and therefore data in a memory page is modified. In this case, the first VMM may record a specific memory page that is modified in this case.

It should be noted that, in this embodiment of the present disclosure, the dirty memory page location information may be, for example, a dirty memory page bitmap. The dirty memory page bitmap may identify the memory page of the operating system in the source BMS using 0 and 1. When data is written into the memory page, a bitmap value is 1; and when no data is written into the memory page, the bitmap value is 0. The dirty memory page bitmap records a memory page number, and records 0 or 1 for different memory page numbers.

Alternatively, the dirty memory page bitmap sequentially marks a plurality of consecutive memory pages with 0 or 1, to obtain a binary string composed of 0 and 1.

The dirty memory page location information may alternatively be implemented in another manner. A specific memory page that is modified in the source BMS may be learned based on the dirty memory page location information.

S206: An I/O processing module of the source hardware card enables a dirty page tracking function to track a dirty page generated by an I/O device in the source hardware card, to generate second dirty memory page location information in the source hardware card.

The I/O device of the source hardware card is a device provided by the source hardware card to the source BMS for use, for example, a virtual function (VF) provided by the network adapter 314 of the source hardware card in FIG. 3 to the source BMS for use.

In some other examples, the source hardware card may be connected to external input devices such as a mouse and a keyboard, and provide the external input devices to the source BMS. In this case, the external input devices may also be referred to as the I/O devices of the source hardware card.

In this embodiment of the present disclosure, the I/O device of the source hardware card may write data into the first memory of the source BMS in a direct memory access (DMA) manner. In this case, because DMA writing is performed on the first memory using an external device of the source hardware card, the first VMM cannot monitor this case, and therefore, the source hardware card needs to enable the dirty page tracking function to track a dirty page generated in the source hardware card.

S207: An intelligent transfer module of the source hardware card obtains the first dirty memory page location information from the source BMS, and obtains, from the source BMS based on the first dirty memory page location information, a dirty memory page generated by the first operating system.

The intelligent transfer module of the source hardware card obtains, from the memory based on the first dirty memory page location information, at least one first memory page that generates a dirty page.

The first dirty memory page location information may be mapped by the source BMS to the source hardware card (for example, basic address register (BAR) space of the I/O device) using a memory mapping mechanism, or may be stored into the first memory of the source BMS. Correspondingly, the intelligent transfer module of the source hardware card may read the first dirty memory page location information, and then obtain, from the first memory of the source BMS through DMA transmission, the dirty memory page generated by the first operating system. Alternatively, the intelligent transfer module of the source hardware card may read the first dirty memory page location information from the first memory of the source BMS through DMA transmission, and obtain, from the first memory of the source BMS through DMA transmission, the dirty memory page generated by the first operating system.

S208: The intelligent transfer module of the source hardware card obtains the second dirty memory page location information, and obtains, based on the second dirty memory page location information, a dirty memory page generated by the I/O device.

The intelligent transfer module of the source hardware card obtains, from the first memory based on the second dirty memory page location information, at least one second memory page generated by the I/O device of the source hardware card.

S209: The source hardware card sends, to the target hardware card, the dirty memory page generated by the first operating system and the dirty memory page generated by the I/O device.

The intelligent transfer module of the source hardware card sends the at least one first memory page and the at least one second memory page to the target hardware card.

S210: The target hardware card restores, to first memory of the target BMS, the dirty memory page generated by the first operating system.

S211: The target hardware card restores, to the target hardware card, the dirty memory page generated by the I/O device.

The target hardware card sets the memory of the target BMS based on the at least one first memory page and the at least one second memory page.

S212: The intelligent transfer module of the source hardware card determines whether a down standard is met; and if the down standard is not met, go back to step S207; or if the down standard is met, send a notification 1 to the source hardware card.

The down standard is that a data volume of the dirty memory page generated by the first operating system in the source BMS and the dirty memory page generated by the I/O device in the source hardware card is less than a current network bandwidth capacity.

If the data volume of the dirty memory page generated by the first operating system in the source BMS and the dirty memory page generated by the I/O device in the source hardware card is greater than or equal to the current network bandwidth capacity, the source hardware card cannot transmit all the dirty memory pages to the target hardware card at a time through a current network, and the source BMS cannot meet the down standard. Therefore, after the source hardware card obtains, for the first time, the dirty memory page generated by the first operating system in the source BMS and the dirty memory page generated by the I/O device in the source hardware card and before the source BMS is down, the first operating system in the source BMS and the I/O device each generate a new dirty memory page. In this case, the source hardware card needs to repeatedly perform steps of obtaining the new dirty memory page generated by the first operating system in the source BMS and the new dirty memory page generated by the I/O device in the source hardware card, and sending the obtained new dirty memory pages to the target hardware card, until a data volume of the new dirty memory page generated by the first operating system in the source BMS and the new dirty memory page generated by the I/O device in the source hardware card is less than the current network bandwidth capacity, and the source BMS meets the down standard and is down.

The source BMS sends the notification 1 to the source hardware card through a channel that is physically connected between the source BMS and the source hardware card. For example, the channel is a PCIE channel. The notification 1 is used to notify the source hardware card that the source BMS can stop running. In this case, the source hardware card obtains a status of the I/O device of the source hardware card (that is, the first I/O device status), and obtains a status of an I/O device of the source BMS (that is, a second I/O device status).

S213: The intelligent transfer module of the source hardware card obtains the first I/O device status in the first shared memory and obtains the second I/O device status in the source hardware card.

After determining, in step S212, that the source BMS meets the down standard, the source BMS records the status of the I/O device of the source BMS into the first shared memory, and the intelligent transfer module of the source hardware card obtains the first I/O device status in the first shared memory.

The I/O device of the source BMS is, for example, a driver program invoked by the operating system in the source BMS using the first processor to read and write data into the first memory, and the first VMM of the source BMS may record the status of the I/O device of the source BMS.

S214: The intelligent transfer module of the source hardware card sends the first I/O device status and the second I/O device status to the target hardware card. Correspondingly, the target hardware card receives the first I/O device status and the second I/O device status that are sent by the intelligent transfer module of the source hardware card.

S215: The target hardware card restores the first I/O device status to an I/O device of the target BMS.

The target hardware card sends the first I/O device status to the second VMM of the target BMS, and the second VMM sets the first I/O device status to the I/O device of the target BMS.

The I/O device of the target BMS is, for example, a driver program invoked by an operating system in the target BMS using a third processor (as shown in FIG. 4) to read and write data into second memory (as shown in FIG. 4). The second VMM of the target BMS may set a status of the I/O device of the target BMS to the first I/O device status, such that the status of the I/O device of the target BMS is the same as the status of the I/O device of the source BMS.

S216: The target hardware card restores the second I/O device status to the target hardware card.

The target hardware card sets the status of the I/O device of the target hardware card to the second I/O device status, such that the status of the I/O device of the target hardware card is the same as the status of the I/O device of the source hardware card.

The I/O device of the target hardware card is, for example, a VF provided by the target hardware card to the target BMS, and the VF of the target hardware card is set to the second I/O device status, such that the VF of the target hardware card and a VF of the source hardware card have a same device status.

S217: The source BMS disables the first VMM, such that the source BMS runs in a bare-metal state. In addition, the target BMS disables the second VMM, and sends a notification 3 to the target hardware card, where the notification 3 is used to notify the target hardware card that the target BMS is switched to the bare-metal state.

S218: The source hardware card stops mounting the network disk.

It may be understood that data that needs to be migrated includes data in the network disk (that is, a storage resource). In this case, when migration starts, the network disk is first disposed on the target hardware card (step S204) for sharing, such that the source hardware card and the target hardware card share the network disk. When the migration ends, the source hardware card stops mounting the network disk.

S219: The source hardware card sends network configuration information to the target hardware card. Correspondingly, the target hardware card receives the network configuration information sent by the source hardware card.

The network configuration information includes information such as IP address configuration and bandwidth packet configuration of the source BMS, and is related information of a network resource provided by the source hardware card for the source BMS.

S220: The source hardware card notifies the cloud management platform that migration of the source BMS is completed.

S221: The target hardware card performs network configuration on the target hardware card based on the network configuration information.

In this step, the target hardware card sets network configuration related to the tenant to be consistent with that of the source hardware card, and sets the network configuration as network configuration of the target BMS. For example, the target hardware card records the IP address configuration and the bandwidth packet configuration of the source BMS an IP address configuration and bandwidth packet configuration of the target BMS.

In this step, the network resource of the source BMS is transferred to the target hardware card through processing of the source hardware card and the target hardware card.

S222: The target hardware card notifies the cloud management platform that the target BMS is ready.

In this step, after the storage resource, the computing resource, and the network resource of the source BMS are all transferred to the target BMS, the target hardware card notifies the cloud management platform that the destination BMS is ready. In this case, when the tenant remotely logs in to the source BMS based on the IP address of the source BMS, the tenant actually logs in to the target BMS. However, because a switching process is embodied in steps S219 to S221 related to the network configuration information, the tenant cannot log in to the source BMS and the destination BMS temporarily due to the steps S219 to S221. However, suspension caused by the steps may be controlled at a second level, and generally, the tenant cannot be aware of the suspension. Therefore, the tenant cannot be aware of the foregoing migration process, and tenant experience can be ensured while a BMS is migrated.

In summary, in this embodiment of the present disclosure, a BMS can be migrated without awareness of the tenant, such that tenant experience can be greatly improved.

Figure 7:
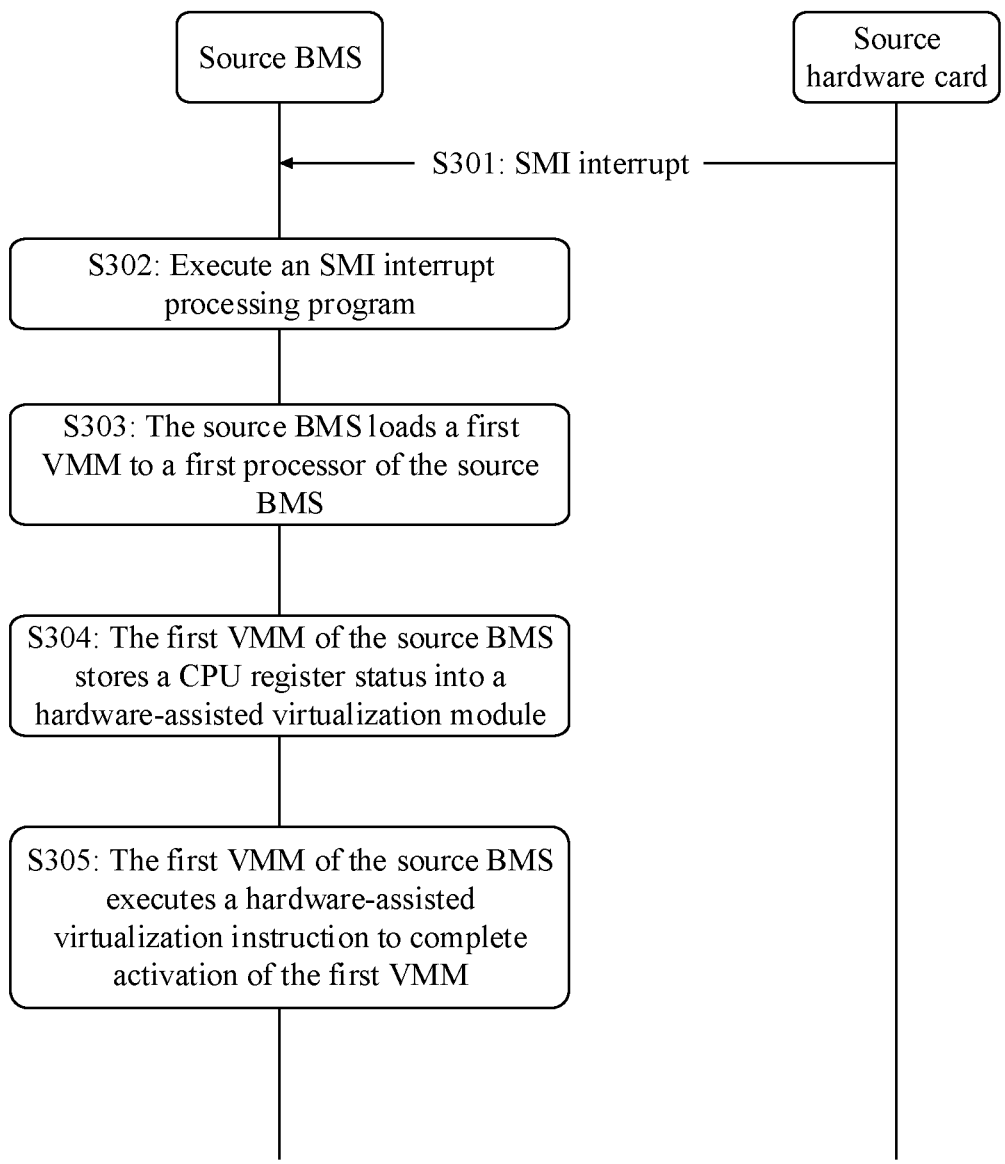
FIG. 7 is an interaction flowchart of a method for activating a first VMM by a source BMS according to this application.
Figure 8:
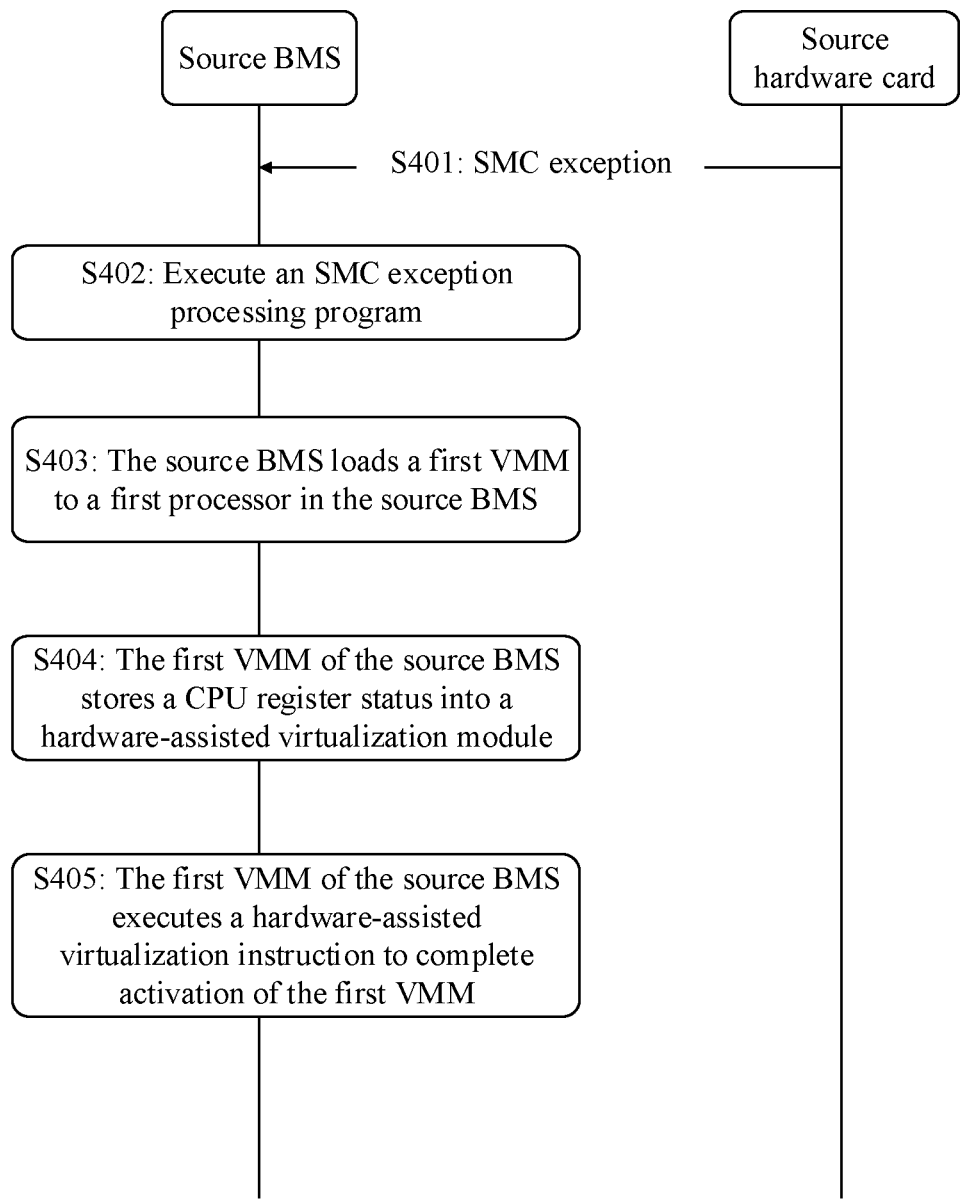
FIG. 8 is an interaction flowchart of another method for activating a first VMM by a source BMS according to this application.

The following method shown in FIG. 7 is a method for activating a first VMM of a source BMS when a first processor in the source BMS is an x86 processor. The following method shown in FIG. 8 is a method for activating a first VMM of a source BMS when a first processor in the source BMS is an ARM processor. FIG. 7 is an interaction flowchart of a method for activating a first VMM by a source BMS according to this application. As shown in FIG. 7, the method for activating a first VMM by a source BMS includes the following steps.

S301: A dynamic configuration module of a source hardware card sends, to a source BMS, an interrupt signal indicating an SMI interrupt. Correspondingly, the source BMS receives the interrupt signal that indicates the SMI interrupt and that is sent by the dynamic configuration module of the source hardware card.

After the source BMS receives the SMI interrupt sent by the dynamic configuration module of the source hardware card, a first processor of the source BMS enters an SMM mode. For details, refer to the foregoing description of the SMM. Details are not described herein again.

S302: The source BMS executes an SMI interrupt processing program to store a CPU register status in the source BMS into an SMRAM, and then stores the CPU register status into first shared memory.

The first shared memory may be set in first memory of the source BMS, and the first shared memory may be accessed by a first operating system in the source BMS and a first VMM in the source BMS.

S303: The source BMS loads the first VMM to the first processor of the source BMS.

S304: The first VMM of the source BMS stores the CPU register status into a hardware-assisted virtualization module.

The hardware-assisted virtualization module may be a virtual machine control structure (VMCS), a virtual machine control block (VMCB), or the like.

S305: The first VMM of the source BMS executes a hardware-assisted virtualization instruction to complete activation of the first VMM.

After the first VMM is activated, the first operating system in the source BMS runs on a virtual machine, and both a CPU virtualization function and a memory virtualization function are enabled. In addition, to avoid degradation of I/O performance of the source BMS, an I/O device is presented to the virtual machine in a straight-through manner for use.

FIG. 8 is an interaction flowchart of another method for activating a first VMM by a source BMS according to this application. As shown in FIG. 8, the method for activating a first VMM by a source BMS includes the following steps.

S401: A dynamic configuration module of a source hardware card sends an SMC exception to a source BMS. Correspondingly, the source BMS receives the SMC exception sent by the dynamic configuration module of the source hardware card.

After the source BMS receives the SMC exception sent by the dynamic configuration module of the source hardware card, a first processor of the source BMS enters an EL3 mode. For details, refer to the foregoing description of the EL3 mode. Details are not described herein again.

S402: The source BMS executes an SMC exception processing program to store a CPU register status in the source BMS into an SMR, and then stores the CPU register status into first shared memory.

The first shared memory may be set in first memory of the source BMS, and the first shared memory may be accessed by a first operating system in the source BMS and a first VMM in the source BMS.

S403: The source BMS loads the first VMM to the first processor of the source BMS.

S404: The first VMM of the source BMS stores the CPU register status into a hardware-assisted virtualization module.

S405: The first VMM of the source BMS executes a hardware-assisted virtualization instruction to complete activation of the first VMM.

After the first VMM is activated, the first operating system in the source BMS runs on a virtual machine, and both a CPU virtualization function and a memory virtualization function are enabled. In addition, to avoid degradation of I/O performance of the source BMS, an I/O device is presented to the virtual machine in a straight-through manner for use.

Figure 9:
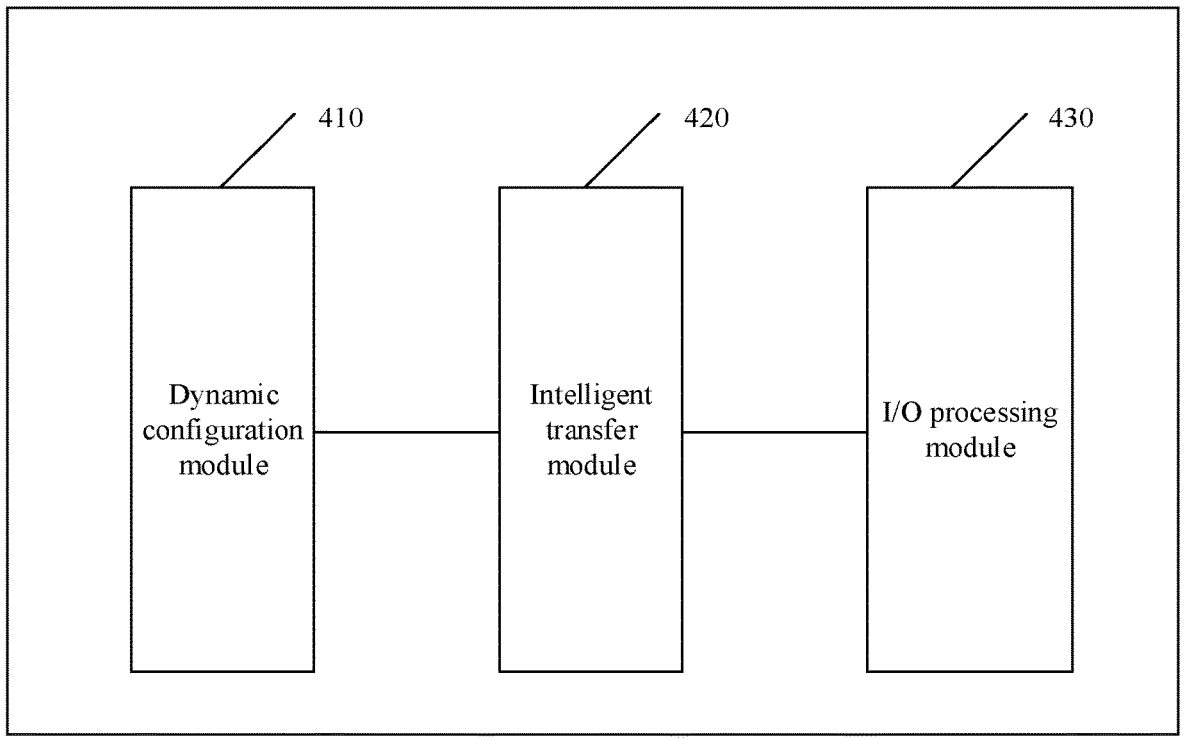
FIG. 9 is a schematic diagram of a structure of a hardware card according to this application.

FIG. 9 is a schematic diagram of a structure of a hardware card according to this application. As shown in FIG. 9, the hardware card in this application includes a dynamic configuration module 410, an intelligent transfer module 420, and an I/O processing module 430.

The dynamic configuration module 410 is configured to receive a migration command for a first bare metal server, where a first hardware card is inserted into the first bare metal server.

The intelligent transfer module 420 is configured to notify, based on the migration command, the first bare metal server to start a virtual machine manager in the first bare metal server, where the virtual machine manager records first dirty memory page location information that is for memory of the first bare metal server and that is generated by the first bare metal server, and sends the first dirty memory page location information to the first hardware card.

The intelligent transfer module 420 is configured to online migrate a dirty memory page of the first bare metal server to a second bare metal server based on the first dirty memory page location information.

Optionally, the I/O processing module 430 is configured to: obtain a first I/O device status of an I/O device of the first bare metal server, obtain a second I/O device status of an I/O device of the first hardware card, and send the first I/O device status and the second I/O device status to a second hardware card.

For simplicity, the hardware card is not described herein. For details, refer to FIG. 2, FIG. 3 and related descriptions. In addition, the modules in the hardware card may perform steps performed by the modules in FIG. 5 to FIG. 8. For details, refer to FIG. 5 to FIG. 8 and related descriptions. Details are not described herein again.

An embodiment of this application provides a BMS system. The BMS system in this embodiment includes a BMS and a hardware card, where the hardware card may be inserted into the BMS.

Figure 10:
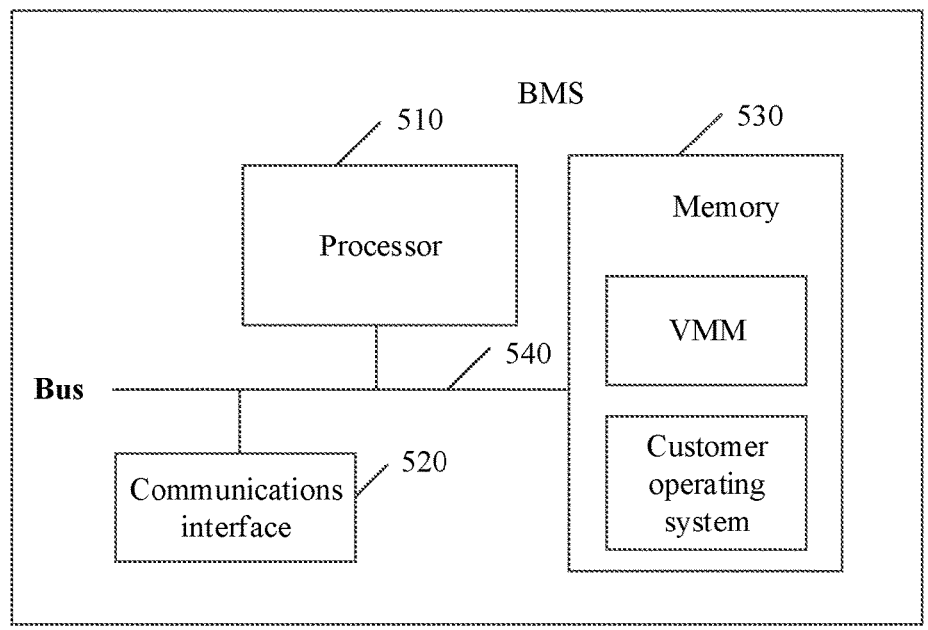
FIG. 10 is a schematic diagram of a structure of a BMS according to this application.

As shown in FIG. 10, the BMS includes one or more processors 510, a communications interface 520, and a memory 530. The processor 510, the communications interface 520, and the memory 530 may be connected using a bus 540. The bus may be a PCIE bus or another high-speed bus.

The processor 510 includes one or more general purpose processors. The general purpose processor may be any type of device that can process electronic instructions, including a central processing unit (CPU), a microprocessor, a microcontroller, a main processor, a controller, an application specific integrated circuit (ASIC), and the like. The processor 510 executes various types of digital storage instructions, such as a software or firmware program stored in the memory 530, which can enable the BMS to provide a relatively wide variety of services. For example, the processor 510 can execute a program or process data to perform at least a part of the method discussed herein.

The communications interface 520 may be a wired interface (for example, an Ethernet interface), and is configured to communicate with a client. When the communications interface 520 is a wired interface, the communications interface 520 may use a protocol family above Transmission Control Protocol (TCP)/IP, such as an RAAS protocol, a remote function call (RFC) protocol, a simple object access protocol (SOAP), a simple network management protocol (SNMP), a common object request broker architecture (CORBA) protocol, and a distributed protocol.

The memory 530 may include a volatile memory, such as a random access memory (RAM). The memory may alternatively include a non-volatile memory, such as a read-only memory (ROM), a flash memory, a hard disk drive (HDD) or solid-state drive (SSD) memory, or may include a combination of the foregoing types of memories. The memory may be configured to store a customer operating system and a VMM.

It may be understood that the foregoing BMS may be configured to perform steps performed by the source BMS or the target BMS shown in FIG. 5 to FIG. 8. For details, refer to FIG. 5 to FIG. 8 and related descriptions.

Figure 11:
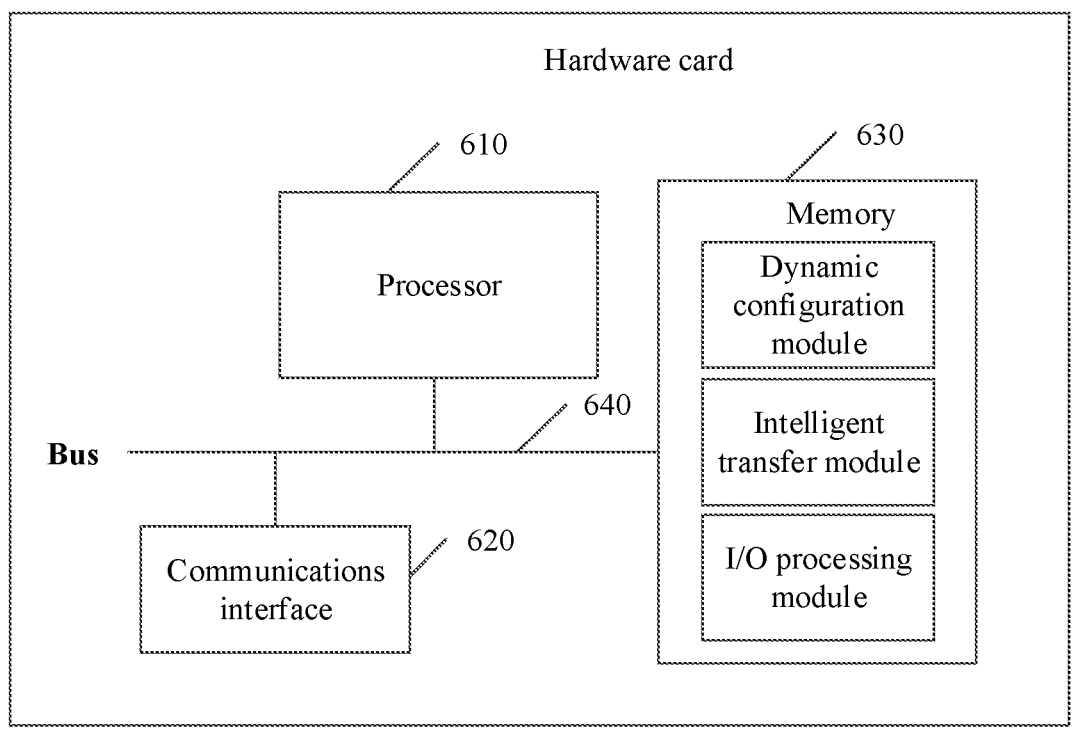
FIG. 11 is a schematic diagram of a structure of another BMS according to this application.

As shown in FIG. 11, the hardware card includes one or more processors 610, a communications interface 620, and a memory 630. The processor 610, the communications interface 620, and the memory 630 may be connected using a bus 640.

The processor 610 includes one or more general purpose processors. The general purpose processor may be any type of device that can process electronic instructions, including a central processing unit (CPU), a microprocessor, a microcontroller, a main processor, a controller, an application-specific integrated circuit (ASIC), and the like. The processor 610 executes various types of digital storage instructions, such as a software or firmware program stored in the memory 630, which can enable a client to provide a wide variety of services. For example, the processor 610 can execute a program or process data to perform at least a part of the method discussed herein.

The communications interface 620 may be a wired interface (for example, an Ethernet interface), and is configured to communicate with a server or a user. When the communications interface 620 is a wired interface, the communications interface 620 may use a protocol family above TCP/IP, such as an RAAS protocol, a remote function call (RFC) protocol, a simple object access protocol (SOAP), a Simple Network Management Protocol (SNMP), a common object request broker architecture (CORBA) protocol, and a distributed protocol.

The memory 630 may include a volatile memory, such as a random access memory (RAM). The memory may alternatively include a non-volatile memory, such as a read-only memory (ROM), a flash memory, a hard disk drive (HDD) or solid-state drive (SSD) memory, or may include a combination of the foregoing types of memories. The memory 630 may be configured to store a dynamic configuration module, an intelligent transfer module, and an I/O processing module.

It may be understood that the foregoing BMS may be configured to perform steps performed by the source hardware card or the target hardware card shown in FIG. 5 to FIG. 8. For details, refer to FIG. 5 to FIG. 8 and related descriptions.

In the foregoing solution, after receiving a migration command, the source hardware card notifies a source bare metal server to start a virtual machine manager to record first dirty memory page location information that is for memory of the source bare metal server and that is generated by the source bare metal server, to online migrate a dirty memory page of the source bare metal server to a target bare metal server, thereby implementing online migration of a BMS. In addition, the source hardware card undertakes work of online migrating a dirty memory page of the target bare metal server based on the first dirty memory page location information, such that a burden of the source bare metal server can be effectively reduced.

All or a part of the foregoing embodiments may be implemented using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a storage disk, or a magnetic tape), an optical medium (for example, a digital video disc (DVD)), a semiconductor medium (for example, a solid-state drive (SSD)), or the like.

What is claimed is:

1. An online migration system for a bare metal server, wherein the online migration system comprises:
    a first bare metal server comprising a first memory and configured to generate first dirty memory page location information for the first memory;
    a second bare metal server;
    a second hardware card; and
    a first hardware card inserted into the first bare metal server, wherein the first hardware card is configured to:
        receive a migration command for the first bare metal server from a cloud management platform;
        notify, based on the migration command, the first bare metal server to start a virtual machine manager in the first bare metal server to record the first dirty memory page location information;
        receive the first dirty memory page location information from the virtual machine manager; and
        online migrate a dirty memory page of the first bare metal server to the second bare metal server based on the first dirty memory page location information.

2. The online migration system according to claim 1, wherein the first hardware card is further configured to:
    generate second dirty memory page location information for the first memory; and
    record the second dirty memory page location information.

3. The online migration system according to claim 2, wherein the first hardware card is further configured to:
    obtain, from the first memory based on the first dirty memory page location information, at least one first memory page that generates a dirty page;
    obtain, from the first memory based on the second dirty memory page location information, at least one second memory page that generates a dirty page; and
    send the at least one first memory page and the at least one second memory page to the second hardware card,
    wherein the second bare metal server comprises a second memory, and
    wherein the second hardware card is inserted into the second bare metal server and configured to:
    connect to the first hardware card through a network; and
    set the second memory based on the at least one first memory page and the at least one second memory page.

4. The online migration system according to claim 1, wherein the first hardware card is further configured to:
    obtain a first input/output (I/O) device status of a first I/O device of the first bare metal server;
    obtain a second I/O device status of a second I/O device of the first hardware card; and
    send the first I/O device status and the second I/O device status to the second hardware card, and
    wherein the second hardware card is configured to:
        set a third I/O device of the second hardware card based on the second I/O device status; and
        send the first I/O device status to the second bare metal server to enable the second bare metal server to set a fourth I/O device of the second bare metal server based on the first I/O device status.

5. The online migration system according to claim 1, wherein the first bare metal server is configured to send a full memory page of the first bare metal server to the first hardware card, wherein the first hardware card is further configured to send the full memory page to the second hardware card, and wherein the second hardware card is configured to initialize a second memory of the second bare metal server based on the full memory page.

6. The online migration system according to claim 1, wherein the second hardware card is configured to:
    receive the migration command;
    mount, based on the migration command, a network disk mounted on the first hardware card; and
    notify the second bare metal server to start a second virtual machine manager in the second bare metal server.

7. The online migration system according to claim 1, wherein the first hardware card is further configured to send network configuration information of a source bare metal server to the second hardware card, and wherein the second hardware card is configured to perform network configuration based on the network configuration information.

8. The online migration system according to claim 1, wherein the first hardware card is further configured to notify the cloud management platform that migration of the first bare metal server is completed.

9. The online migration system according to claim 1, wherein shared memory is set on the first hardware card, and wherein the shared memory is accessed by the virtual machine manager of the first bare metal server.

10. The online migration system according to claim 1, wherein the first hardware card is further configured to generate an interrupt signal based on the migration command, and wherein the first bare metal server is configured to:
- receive the interrupt signal; and
- start the virtual machine manager based on the interrupt signal.

11. The online migration system according to claim 10, wherein the interrupt signal is a system management interrupt of an x86 processor.

12. The online migration system according to claim 10, wherein the interrupt signal is a secure monitor call (SMC) of an ARM processor.

13. The online migration system according to claim 10, wherein the interrupt signal is a secure interrupt of an ARM processor.

14. A bare metal server system, comprising:
- a first bare metal server; and
- a first hardware card inserted into the first bare metal server, wherein the first hardware card is configured to:
  - receive a migration command for the first bare metal server from a cloud management platform;
  - notify, based on the migration command, the first bare metal server to start a virtual machine manager in the first bare metal server, wherein the virtual machine manager records first dirty memory page location information that is for a first memory of the first bare metal server and that is generated by the first bare metal server:
  - receive the first dirty memory page location information from the virtual machine manager; and
  - online migrate a dirty memory page of the first bare metal server to a second bare metal server based on the first dirty memory page location information.

15. A hardware card comprising:
a processor; and
a memory configured to store instructions executable by the processor to cause the hardware card to:
- receive, from a cloud management platform, a migration command for a first bare metal server in which the hardware card is inserted;
- notify the first bare metal server to start a virtual machine manager in the first bare metal server based on the migration command, wherein the virtual machine manager records first dirty memory page location information that is for a first memory of the first bare metal server and that is generated by the first bare metal server;
- receive the first dirty memory page location information from the virtual machine manager; and
- online migrate a dirty memory page of the first bare metal server to a second bare metal server based on the first dirty memory page location information.

16. The hardware card according to claim 15, wherein after receiving the a migration command, the hardware card is further caused to record second dirty memory page location information that is for the first memory of the first bare metal server and that is generated by the hardware card.

17. The hardware card according to claim 15, wherein the hardware card is further caused to generate an interrupt signal based on the migration command.

18. The hardware card according to claim 17, wherein the interrupt signal is a system management interrupt of an x86 processor.

19. The hardware card according to claim 17, wherein the interrupt signal is a secure monitor call (SMC) of an ARM processor.

20. The hardware card according to claim 17, wherein the interrupt signal is a secure interrupt of an ARM processor.

* * * * *